United States Patent [19]

Galockin et al.

[11] Patent Number: 4,722,267

[45] Date of Patent: Feb. 2, 1988

[54] FRENCH FRY VENDING MACHINE

[76] Inventors: Longin Galockin; Eric Galockin, both of 1260 Elmwood Ave., Deerfield, Ill. 60015

[21] Appl. No.: 843,153

[22] Filed: Mar. 24, 1986

[51] Int. Cl.⁴ .............................................. A47J 37/00
[52] U.S. Cl. ........................................ 99/357; 99/407; 99/443 R; 126/374; 219/437; 219/438; 219/441; 219/521
[58] Field of Search ............. 99/407, 404, 403, 443 R, 99/443 C, 357, 330, 331; 126/374, 387; 219/400, 436, 437, 438, 439, 441, 521, 530

[56] References Cited

U.S. PATENT DOCUMENTS

| | | | |
|---|---|---|---|
| 3,291,035 | 9/1965 | Ignelzi | 99/357 |
| 3,448,677 | 3/1967 | Dexters | 99/336 |
| 3,620,341 | 11/1971 | Gardner | 194/10 |
| 3,667,373 | 6/1972 | Sicher et al. | 99/407 |
| 3,685,432 | 8/1972 | Hoeberigs | 99/357 |
| 3,690,247 | 9/1972 | Van Cleven et al. | 99/355 |
| 3,702,583 | 11/1972 | Rullman | 99/407 X |
| 3,818,820 | 6/1974 | Harris et al. | 99/407 |
| 3,866,795 | 2/1975 | Urano | 99/357 X |
| 4,084,492 | 4/1978 | Sullivan | 99/330 |
| 4,331,068 | 5/1982 | Asami | 99/357 X |
| 4,359,935 | 11/1982 | Murray | 99/357 X |
| 4,398,651 | 8/1983 | Kumpfer | 99/443 R X |
| 4,428,280 | 1/1984 | Williams et al. | 99/356 |
| 4,438,683 | 3/1984 | Bartfield | 99/407 X |
| 4,457,947 | 7/1984 | Schmidt et al. | 99/407 X |
| 4,489,646 | 12/1984 | Schmidt et al. | 99/330 |
| 4,489,647 | 12/1984 | Stamps et al. | 99/336 |
| 4,505,194 | 3/1985 | Bishop et al. | 99/336 |
| 4,540,588 | 9/1985 | Bartfield | 426/231 |
| 4,574,688 | 3/1986 | Barbieri | 99/407 X |
| 4,586,429 | 5/1986 | Hawkins | 99/407 |
| 4,590,361 | 5/1986 | Del Fabbro | 219/439 |
| 4,592,405 | 6/1986 | Anderson et al. | 99/357 X |

Primary Examiner—H. Hampton Hunter
Attorney, Agent, or Firm—Thomas R. Vigil

[57] ABSTRACT

The french fry food vending machine has a plurality of frozen foodstuff holding compartments in a refrigeration chamber. A metered dispensing rotatable wheel is positioned below the outlet of each holding compartment to, upon activation, dispense a metered quantity of frozen food stuff to a cooking chamber, preferably by the delivery of the foodstuff to a conveyer position beneath a line of metered dispensing rotatable wheels. An oil circulating, filtering, heating and replenishment system is provided to service a deep frying tank with a quantity of Purified hot oil into which frozen food stuff is emerged for a predetermined period of time for cooking.

20 Claims, 16 Drawing Figures

FRENCH FRY VENDING MACHINE

BACKGROUND OF THE INVENTION

1. Field of the Invention

The present invention relates to a coin operated automatic french fry vending machine for vending french fried foodstuff. More specifically, the french fry vending machine of the present invention is directed to a multiple, e.g., four, foodstuff dispensing machine which can provide a quantity of one of several french foodstuff, e.g., shrimp, scallops, french fries and chicken nuggets, to a purchaser in a simple, efficient and automatic manner. Further, the machine provides safety features to ensure that a wholesome product is supplied to a user of the machine and an oil heating, filtering and recirculating system is provided that does not require handling of hot oil by maintenance personnel.

2. Description of the Prior Art

Heretofore various french fry vending machines have been proposed which provide a single french fried foodstuff, such as french fries.

The previously proposed french fry vending machines do not, therefor, provide a variety or selection of french fried foodstuffs to a user of the machine.

Moreover, such machines were relatively complex and often required handling of hot oil by maintenance personnel.

As will be described in greater detail hereinafter, the french fry vending machine of the present invention provides a number of advantages over the previously proposed french fry vending machines. In particular, the french fry vending machine of the present invention provides for the dispensing of a plurality of french fried foodstuffs, namely four different types of foodstuffs.

Furthermore, the machine of the present invention provides a refrigeration chamber where frozen foodstuff is maintained frozen and loss of energy resulting in loss of this maintenance of the frozen condition of the frozen foodstuffs will deactivate the machine.

Additionally, the present invention provides a machine in which oil is filtered, heated, recirculated and after a predetermined number of cycles dumped without requiring any handling of hot oil by maintenance personnel.

SUMMARY OF THE INVENTION

According to the invention there is provided in a french fry vending machine comprising a housing having a front panel and a back panel, an insulated refrigeration chamber within the housing, a cooking chamber within the housing, a coin box including a coin operated switch for energizing the machine, means for transferring foodstuff from the refrigeration chamber to the cooking chamber, means for french frying the foodstuff in the cooking chamber, and means for dispensing the french fried foodstuff, the improvement comprising a plurality of frozen foodstuff holding compartments in said refrigeration chamber, a metered dispensing mechanism positioned below the outlet from each of said holding compartments, said metered dispensing mechanism including an individual metered foodstuff dispensing rotatable wheel for each frozen foodstuff holding compartment, means for actuating a selected one of said dispensing rotatable wheels to dispense a metered quantity of the selected frozen foodstuff onto said transfer means, and means for operating said transfer means to deliver said selected metered quantity of frozen foodstuff to said cooking chamber.

DESCRIPTION OF THE PREFERRED EMBODIMENT

Figures 1, 2:
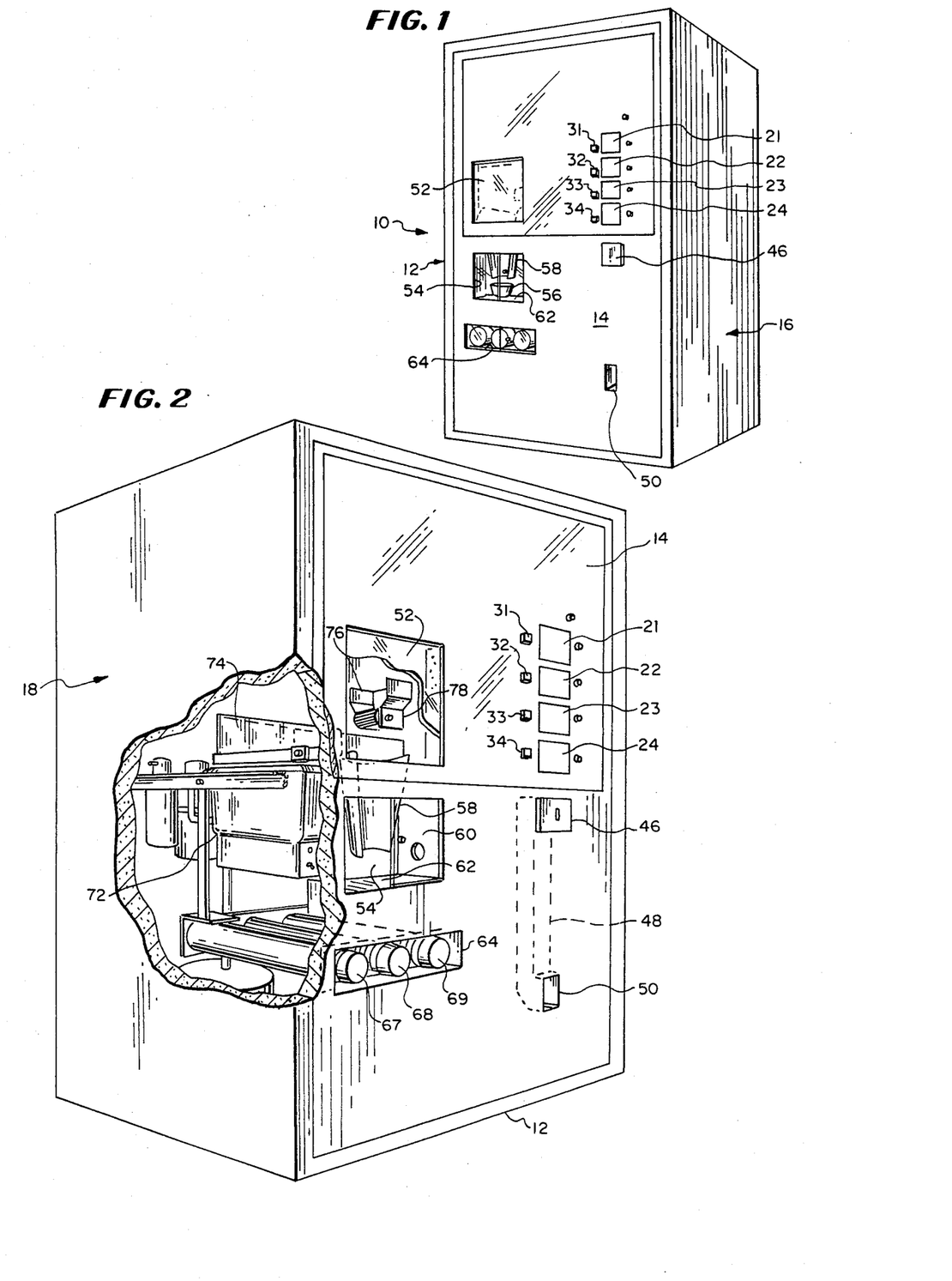
FIG. 1 is a perspective view of the french fry vending machine of the present invention viewing same from a side and a front thereof.
FIG. 2 is a perspective view of the french fry vending machine shown in FIG. 1 viewing same from the other side and the front thereof and has portions broken away to show some of the internal components of the machine.

Referring now to the drawings in greater detail, there is illustrated in FIG. 1 a french fry vending machine 10 constructed according to the teachings of the present invention.

Figure 5:
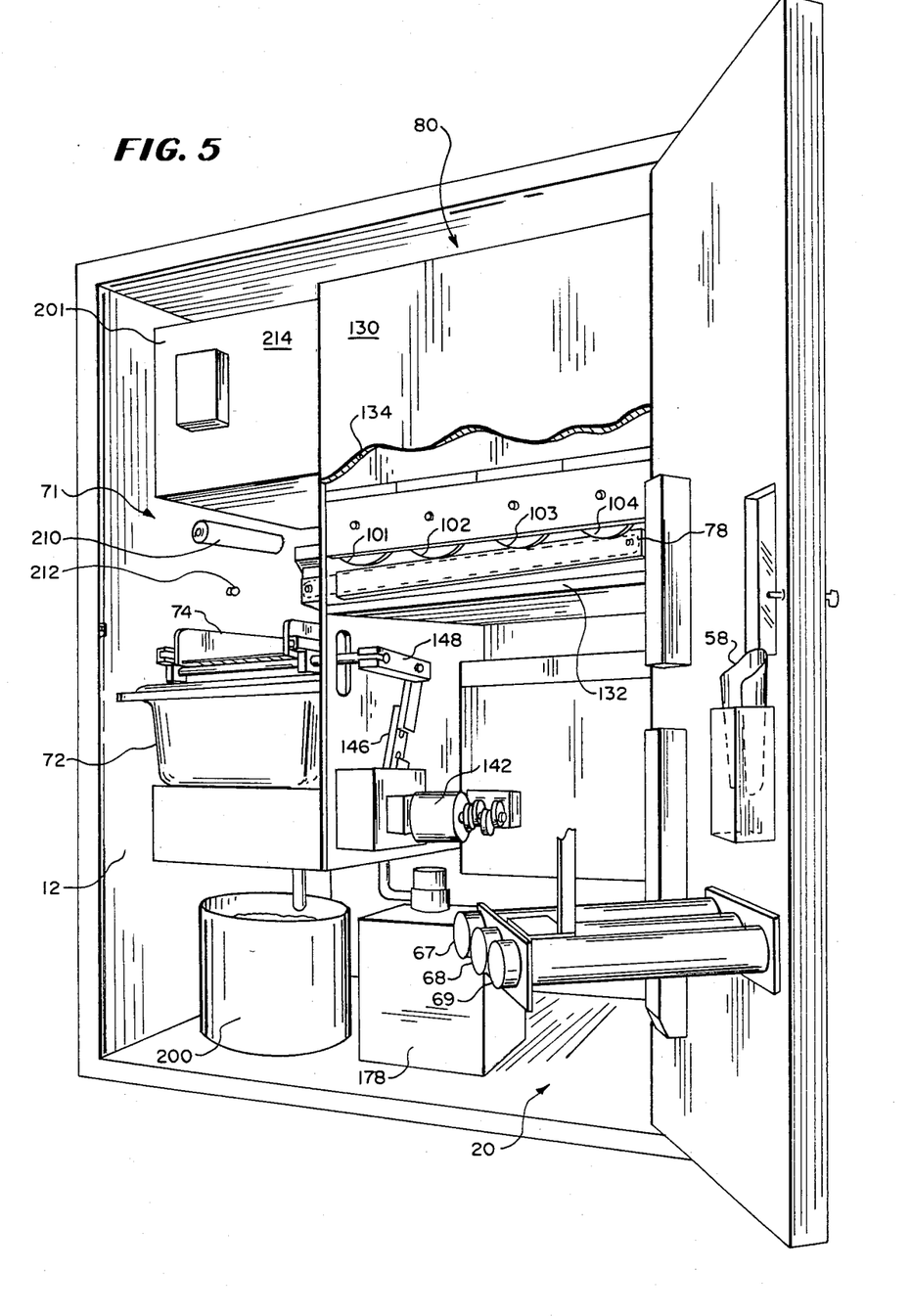
FIG. 5 is a perspective view of the front of the french fry vending machine with a front hinged panel of the machine rotated to an open position to show internal components of the machine.

As shown, the machine 10 includes a housing 12 having a front panel 14, a right side wall 16, a back wall 17 (FIG. 4), a left side wall 18 (FIG. 2), a top wall 19 (FIG. 3) and a bottom wall 20 (FIG. 5).

Figure 16:
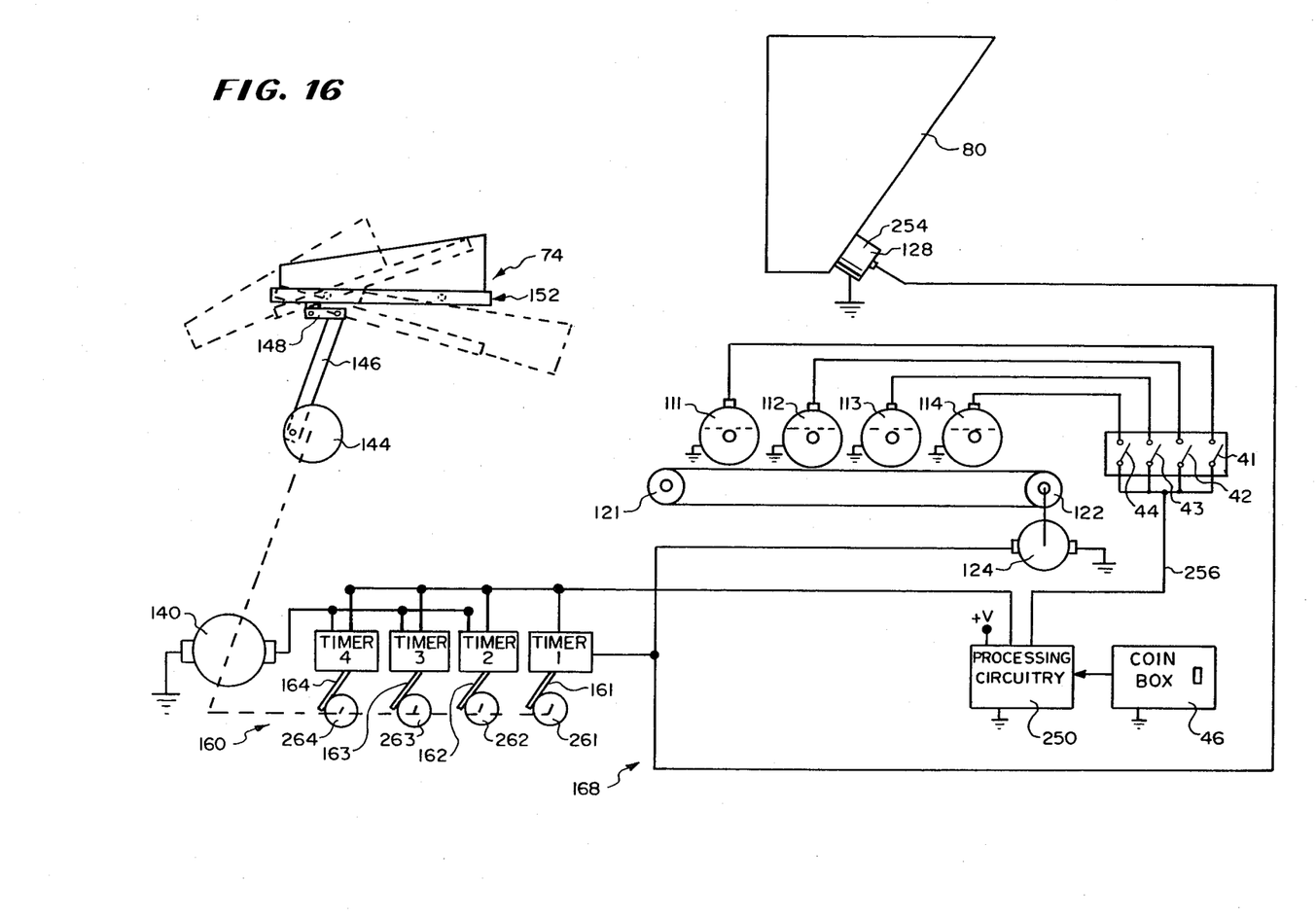
FIG. 16 is a partially mechanical and partially electrical schematic view of the electrical control circuitry for operating the moving components of the machine.

As shown in FIGS. 1 and 2, the front panel 14 has four foodstuff indicating legends 21-24 and an associated pushbutton 31-34 for actuating a pushbutton operated switch 41-44 (FIG. 16). Below the foodstuffs legends 21-24 is a coin box 46 with a coin return chute 48 leading to a coin return slot 50 below the coin box 46.

To the left of the legends 21-24 in the front panel 14 is a window 52, which is optional, through which one can observe the french frying procedure.

Below the window 52 is a food delivering opening 54 for positioning a cup-shaped container or cup 56 for receiving the french fried foodstuff as it is directed to the cup by a funnel 58 part of which can be cut away as shown. The front panel 14 has a transparent door 60 mounted therein for movement to and from a position closing the opening 54. This door 60 can be manually opened or can be automatically opened when a coin has been inserted in the coin box 46 and automatically closes when a cup 56 has been inserted in the opening 56 onto a platform 62 therein and opening again when the french fried foodstuff has been received in the cup 56. A further time delay in the opening of the transparent door 60 can be provided to provide for a short cooling period for the foodstuff. An "electric eye", e.g., a light source and a light sensor, can be positioned on either side of the opening 54 for sensing when a cup 56 is present for controlling actuation of the machine 10 and operation of the door 60.

Below the food delivering opening 54 is a rectangular cup storage opening 64 in the panel 14. A magazine 66 including three dispensers 67, 68 and 69 of cup 56 receive the french fried foodstuff.

If desired, a movable door 70 can be provided over the opening 64 and is normally held automatically closed. Then, after a coin has been inserted in the coin box, suitable electrical circuitry will cause the door 70 to open for a short time period to allow someone to remove a cup 56 from one of the three dispensers 67-69. Then the door 70 is automatically closed and held closed until the next operation of the machine 10.

As shown in FIG. 2, behind the window 52 in the housing 12 is located a cooking chamber 71 having a deep frying tank 72 mounted therein which is continuously supplied with hot cooking oil as will be described in greater detail in connection with the description of FIG. 6. Mounted above the tank 72 is a frying basket 74 which is shown in FIG. 2 at receiving or at-rest position (FIG. 10) and which is movable downwardly into the tank 72 to a cooking position (FIG. 11) for frying foodstuff after a metered quantity of a selected foodstuff has been deposited in the basket 74. After a cooking sequence of approximately one minute, the basket 74 is raised a predetermined amount below or at the at-rest position for a short time period to allow drainage of oil from the french fried foodstuff, after which the basket 74 is raised to a raised position (FIG. 12) for dispensing the french fried foodstuff from the basket through the funnel 58 into a cup 56.

As shown in FIG. 2, an end 76 of a conveyor 78 is positioned over the frying basket 74. The conveyor 78 is adapted to convey foodstuff from a refrigerated chamber 79 to the frying basket 74 upon the actuation of one of the buttons 31-34 and the depositing of the right number of coins in the coin box 46.

Positioned in the cooking chamber 71 beneath the deep frying tank 72 is the magazine 66 of three dispensers, i.e. cannisters, 67-69 of cups 56. Typically, such dispensers 67-69 have a spring mechanism therein with a stack of cup-shaped containers or cups 56 being frictionally held within the respective cannisters 67-69 of the magazine 66 with the spring mechanism acting on the innermost cup 56.

Figures 3, 4:
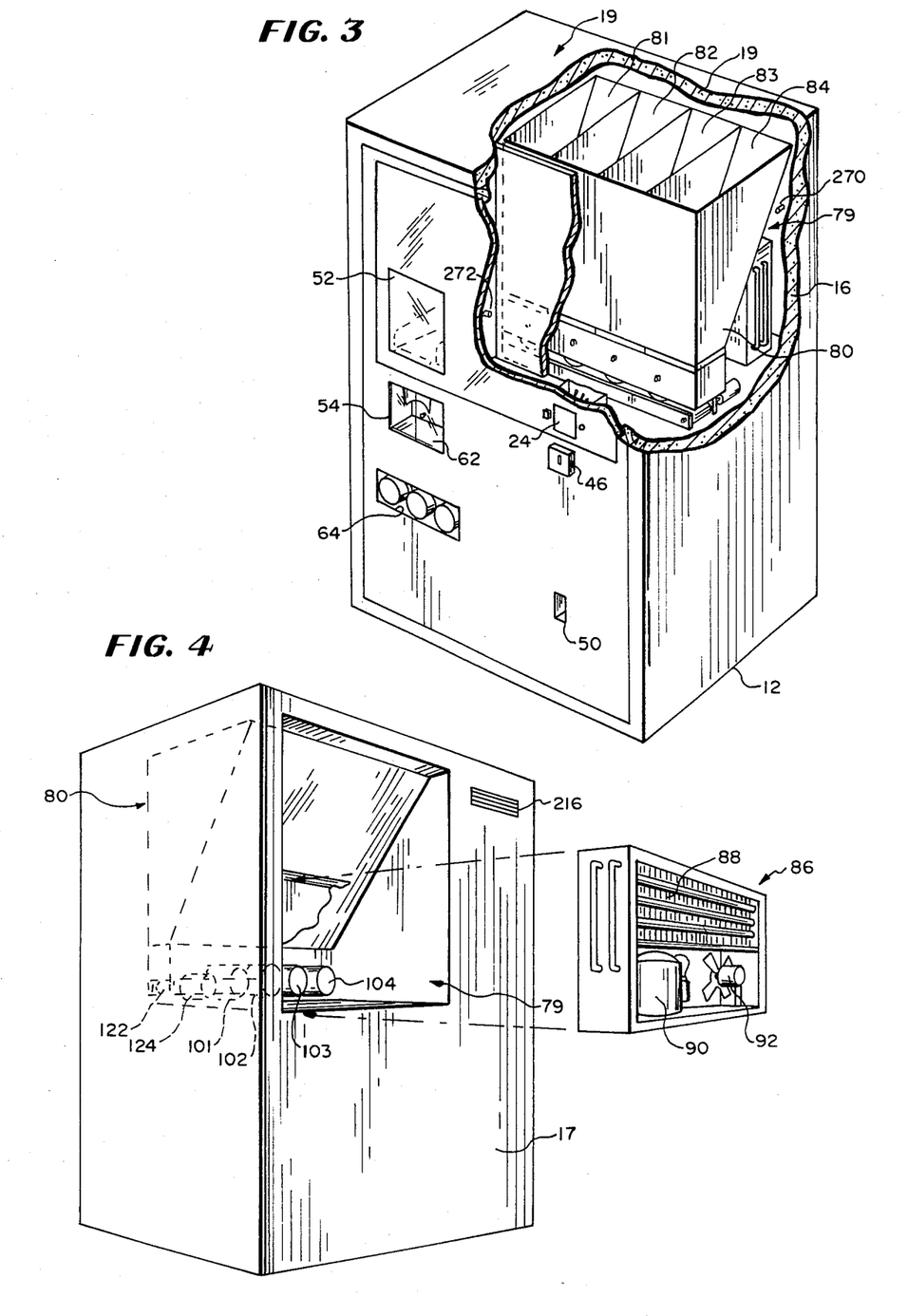
FIG. 3 is a perspective view of the french fry vending machine shown in FIG. 1 viewing same from an upper corner thereof.
FIG. 4 is a perspective view of the french fry vending machine viewing same from the back and one side thereof with a refrigeration unit, including a compressor and condensor, shown exploded rearwardly from the machine.

As best shown in FIG. 3, the refrigerated chamber 79 is located on the right side of the machine 10 to the right of the cooking chamber 71. The refrigeration chamber 79 has a hopper 80 including four compartments 81-84 for receiving and storing four different frozen foodstuffs such as breaded scallops, breaded shrimp, cut potates and breaded chicken nuggets, respectively, for example.

Behind the hopper 80 there is mounted in the chamber 79 a refrigeration unit 86 comprising a condensor 88, compressor 90 and a fan 92.

The lower end of the hopper 80, and more particularly the lower or bottom end 85 of each compartment 81-84 of the hopper 80, is open (see compartment 82 in FIG. 7) and positioned above a foodstuff metering mechanism 94 which comprises four metered foodstuff dispensing wheels 101-104 each having a wide slot 106 formed in a wheel 101-104 along a cord of the circle of the wheel to provide a partial spool shape to each wheel 101-104 with the slot 106 providing a metered space into which only a predetermined amount of foodstuff can fit.

Figure 6:
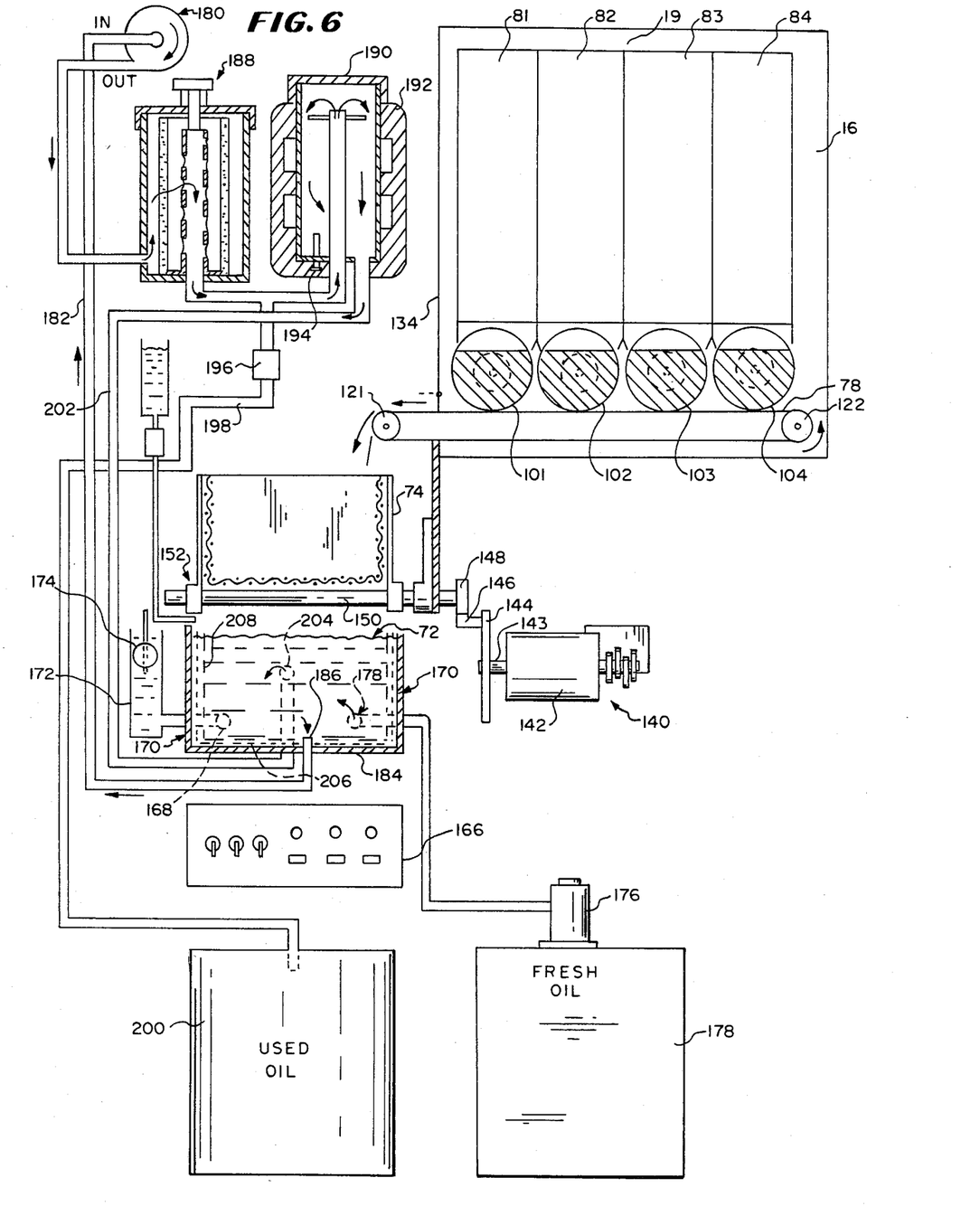
FIG. 6 is a partially mechanical and partially fluid circuit schematic view of the metered foodstuff dispensing wheels, the conveyor, the frying basket, the deep frying tank and, in particular, the oil circulating system.

The metering mechanism 94 further includes four motors 111-114 connected, respectively, to each one of the wheels 101-104 best shown in FIG. 6.

As shown in FIG. 5, the wheels 101-104 of the metering mechanism 94 are positioned over the conveyor 78. Typically, the conveyor 78 has a plurality of wide U-shaped wire members 118 which are loosely connected to two spaced apart wire loops which are trained about conveyor end rollers 121 and 122 (FIG. 6), roller 122 being driven by a motor 124 (FIG. 16). The wire formed conveyor 78 provides a moving grating on which the foodstuff can be carried.

As best shown in FIG. 6, frozen foodstuff that is deposited on the conveyor 78 is carried by the conveyor 78 to and dropped into the frying basket 74.

Figures 7, 8, 9, 10, 11, 12:
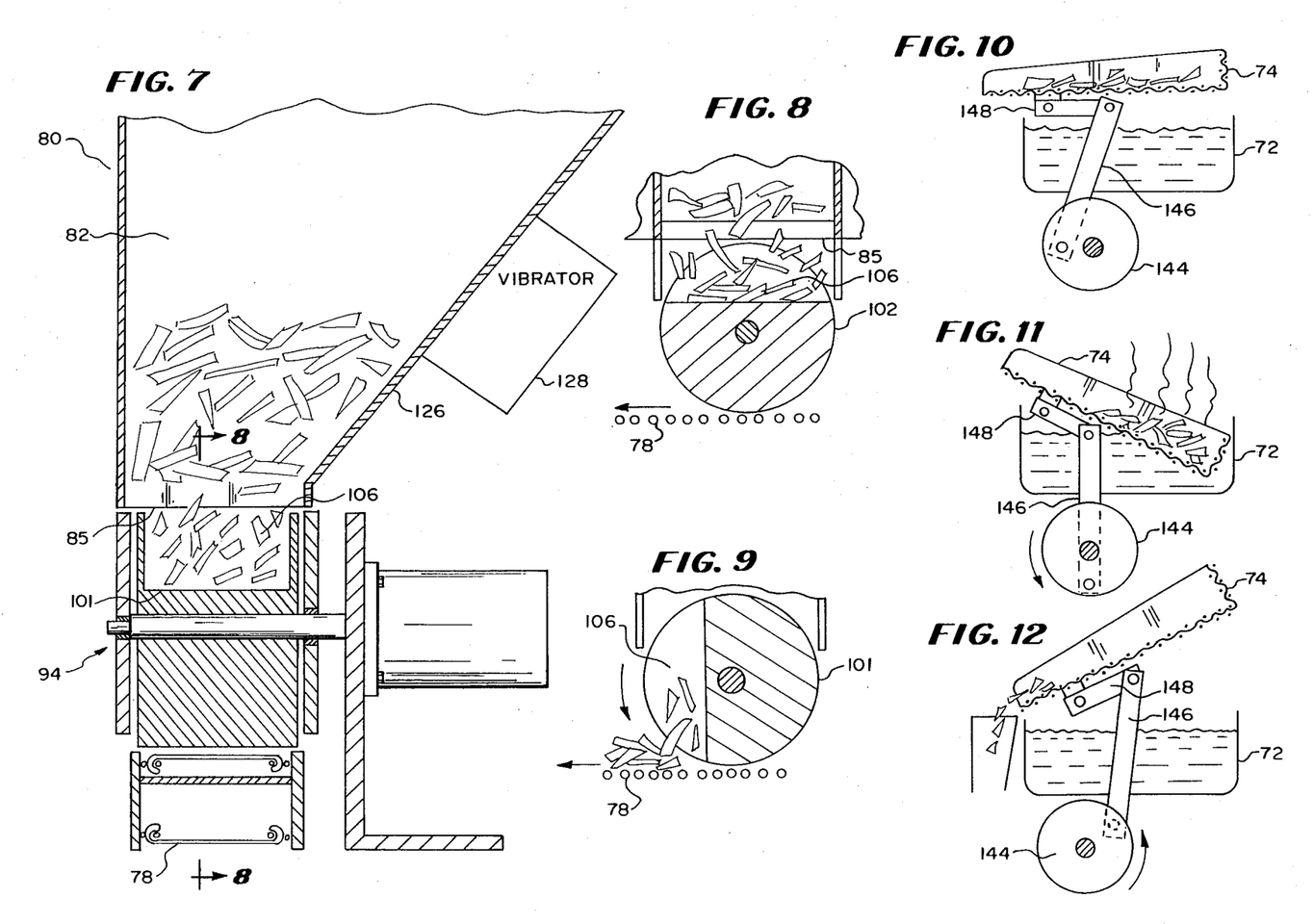
FIG. 7 is a vertical sectional view of the french fry vending machine, is taken along line 7—7 of FIG. 6 and includes a section through a frozen foodstuff storage bin, a metered foodstuff dispensing wheel and a conveyor.
FIG. 8 is a vertical sectional view of the french fry vending machine, is taken along line 8—8 of FIG. 7 and shows one metered foodstuff dispensing wheel positioned above the conveyor which is positioned to receive a metered portion of foodstuff.
FIG. 9 is a fragmentary sectional view of the french fry vending machine similar to the view shown in FIG. 8, but shows the metered foodstuff dispensing wheel rotated from a receiving position to a dispensing position.
FIG. 10 is a generally schematic view of the receiving or at rest position of the frying basket shown in FIG. 6.
FIG. 11 is a generally schematic view of the frying basket similar to the view shown in FIG. 10 and shows the frying basket moved to a frying position.
FIG. 12 is a generally schematic view similar to the views shown in FIGS. 10 and 11 and shows the frying basket rotated to a product dispensing position.

As shown in FIG. 7, frozen foodstuff such as french fries in one compartment 82 will move to a bottom opening 85 of the compartment 82 in the hopper 80 and into the slot 106 in the wheel 101 positioned over the grating type conveyor 78. On a back inclined side wall 126 of the hopper 80, there is mounted an electromechanical vibrator 128. As will be described in greater detail hereinafter, every time the machine is activated, the vibrator 128 is turned on to vibrate frozen foodstuff into the slot 106 in each wheel 101-104 as shown in FIG. 8. Then, when the machine is actuated the wheel will rotate the metered amount of frozen foodstuff in the slot 106 of one of the wheels 101-104 downwardly onto the conveyor 78 as shown in FIG. 9.

While this is happening, the vibrator 128 is continuously vibrating the hopper 80 to cause frozen foodstuff to move to the bottom opening 85 of each compartment 81–84 so that when the wheel 102 returns to the position shown in FIG. 8, it will be refilled with frozen foodstuff and ready for the next operation of the machine.

Also, it will be understood that the upper right hand refrigeration chamber 80 of the machine 10 is fully refrigerated and insulated by a forward panel 130 and insulated platform 132 and an interior insulated wall 134 between cooking chamber 71 and refrigeration chamber 80 and insulated portion of top wall 19, side wall 16 and back wall 17 around the refrigeration unit 86 such that the hopper 80, the motors 111–114, the wheels 101–104 and the grating type conveyor 78 are all under refrigeration. In this respect, all the elements shown in FIG. 7 are under refrigeration.

To minimize energy losses, the machine 10 has a solenoid operated trap door 136 which is hingedly mounted to the wall 134 between the refrigeration chamber 80 and the cooking chamber 71. When the machine 10 is activated, this trap door 136 is opened to allow foodstuff to be carried by the conveyor 78 into the cooking chamber 71 and dumped into the frying basket 74.

Once the foodstuff has been dumped into the frying basket 74, a drive mechanism 140 powered by an electric stepping motor 142 having a motor shaft 143 is caused to rotate a disc 144 to which is eccentrically mounted an adjustable linkage member 146 connected at its upper end to an arm 148 that extends radially outwardly from and is affixed to a shaft 150. The shaft 150 is journaled at each end within the cooking chamber and is fixed to a framework 152 for the frying basket 74. The framework 152 includes two spaced apart guide bars 154 and 156 supporting the basket 74.

When the shaft 150 is rotated, the framework 152 is caused to rotate and that causes the frying basket 74 to rotate. The sequence of operations is shown in FIGS. 10, 11 and 12.

Referring to FIG. 10, the frying basket is shown in a receiving or at-rest position.

As will be described in greater detail hereinafter, after the foodstuff has been deposited on the frying basket 74, as shown in FIG. 10, electrical control circuitry 150 (FIG. 16) for the machine 10 will cause the motor 142 to rotate the disc 144 such that the frying basket 74 is moved into the deep frying tank 72 filled with hot oil.

After a predetermined time period, such as one minute, the frying basket 74 is raised a short distance to a position below or at the at-rest position (shown in FIG. 10) for a few seconds to allow hot oil to drip from the french fried foodstuff and the frying basket 74 back into the tank 72. Then, the disc 144 is rotated a further increment to move the frying basket 74 to the dispensing position shown in FIG. 12, after which the basket is returned to its receiving or at-rest position shown in FIG. 10.

Figure 13:
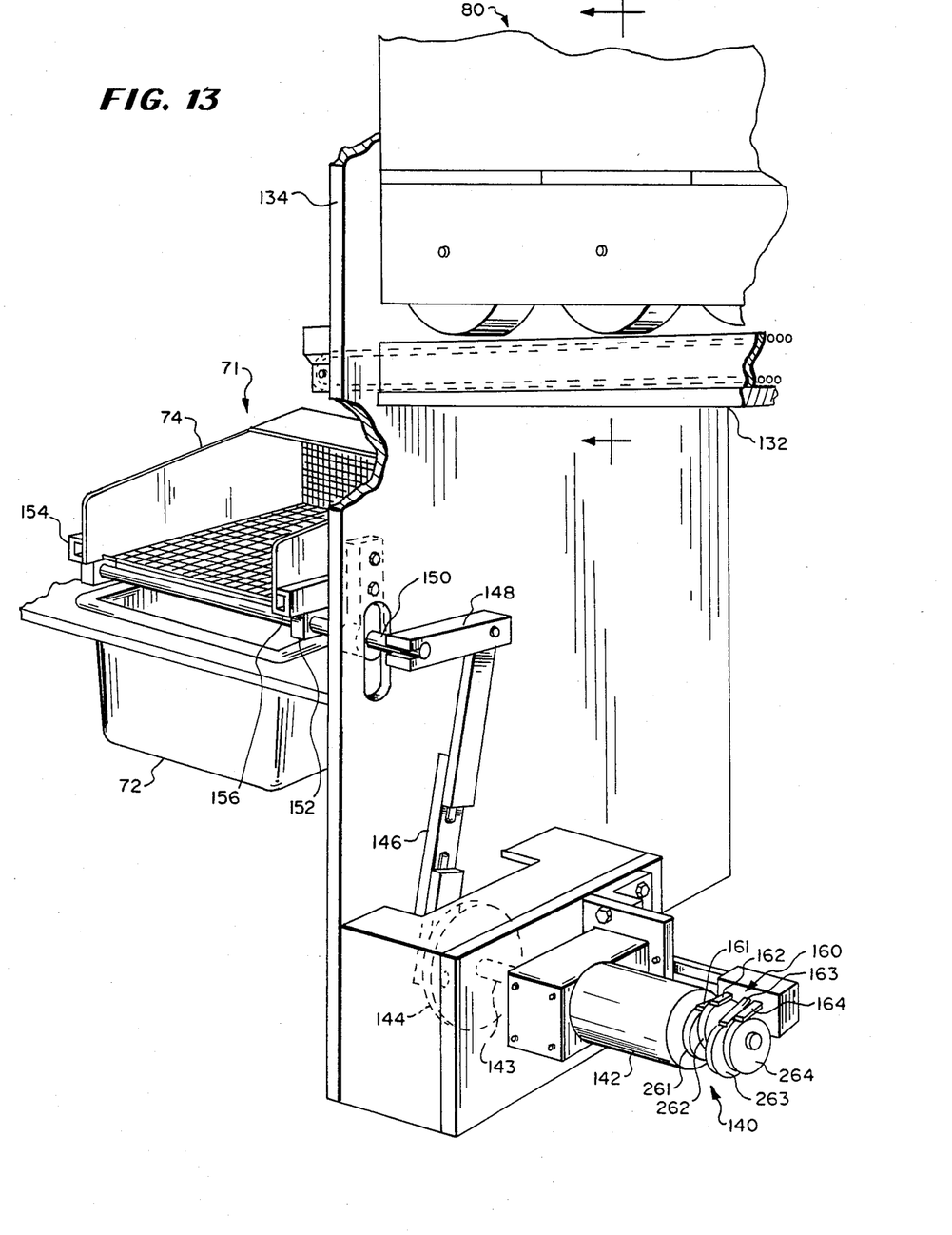
FIG. 13 is a fragmentary perspective view of the french fry vending machine with portions broken away and shows an eccentric drive mechanism and linkage therefor for rotating a frying basket from and back to a receiving or at rest position through a frying position in a deep frying tank containing hot oil.

As shown in FIG. 13, the drive mechanism 140 for rotating the framework 152 holding the frying basket 74 not only includes the motor 142, motor shaft 143, disc 144, adjustable linkage member 146, arm 148 and the shaft 150 but also includes a cam arrangement 160 which operate various switchblades 161–164 associated with timer controlled circuits of the electrical control circuitry 158 which will be described in greater detail hereinafter in connection with the description of FIG. 16.

Returning to FIG. 6, a control box 166 is provided for controlling the heating and circulating of the hot oil received in the deep frying tank 72. In this respect, an outlet opening 168 in a side wall 170 of the tank 72 is connected to a level control tube 172 which has a float 174 of a float switch mounted therein. When the level of the oil drops to a certain point as a result of absorption by the foodstuff during cooking and possibly evaporating, the float 174 will drop to a point where it will cause energization of a pump motor 176 mounted on a container 178 of fresh oil which is stored on the bottom wall 20 of the machine 10. This will cause fresh oil to be pumped into the tank 72 through another opening 178 in the wall 170 until the float 174 operates the float switch connected thereto to deenergize the motor 176.

Then, oil is withdrawn periodically from the tank by a pump 180 through a conduit 182 which extends upwardly through an opening in the bottom wall 184 of the tank 72 to an inlet opening 186. The conduit 182 extends from inlet opening 186 to the pump 180. The oil is pumped by the pump 180 to a filter assembly 188 which traps particles that may be entrained in the oil so that only filtered oil is then supplied to a heating chamber 140 which has an electromagnetic heating coil 192 therearound for heating the oil in the chamber 140. A temperature sensor 194 is mounted in the chamber 190 for sensing the temperature of the oil and for controlling the induction heating of the chamber 190 to maintain the temperature of the oil in the chamber 190 relatively constant. The heated oil is recirculated back into the tank 72.

After a certain predetermined number of frying operations, e.g., 2500, a valve 196 is opened in a drain conduit 198 for draining used oil to a used oil container 200 resting on the bottom wall 20.

The filter assembly 201 is multilayered having as the first lower level a grease and fire trap, a second level comprising an electronic fine particle filter, an upper layer charcoal filter above the fine particle filter and at the top of the assembly wetted curls of polypropylene. The filtered air drawn from the top of the filter assembly is exhausted by a fan through the vent in the back of the housing to atmosphere.

Although the pump 180, the filter assembly 201 and the induction heating chamber 190 are shown mounted above the tank 72, it is to be understood that this is only for the purpose of illustrating the hot oil fluid recirculation circuit for the machine 10 and that these components of the machine 10 are located in the machine 10 beneath the tank 72.

Heated oil from the induction heating chamber 190 is supplied via a conduit 202 back to the tank 72 and through an opening 204 in the wall 170 thereof.

The tank 72 has a lower fine mesh screen 206 for collecting fine particles that accumulate in the tank 72 and a larger coarse mesh screen 208 positioned above the fine mesh screen 206. The outlet conduit 182 that extends into the bottom of the tank 72 extends through openings in the two screens 206 and 208 to a position above the upper coarse screen 208, as shown in FIG. 6, to the inlet opening 186 thereof.

The control box 166 includes various controls and electrical circuitry that are associated with the float switch and the temperature sensor for controlling the recirculation of oil, the heating of oil and the replenishment of oil from the fresh oil tank to the deep frying tank. Also, the control box 166 controls operation of a fire extinguisher 210 (FIG. 5) in the cooking chamber 71 relative to temperature sensed by a temperature sensor 212. Further, the control box 166 controls periodic operation of a fan, not shown, which draws air from the cooking chamber 71 through a multilayer filter box 214 (FIG 5) to and through an outlet vent 216 (FIG. 4) in the back wall 17 of the machine 10.

Also for the purpose of maintaining a high level of purity of the hot oil in the deep frying tank 72, a container 220 of a purifying chemical such as citric acid is provided and has a conduit 222 extending therefrom through a proportioning valve 224 to an outlet 226 positioned above the level of the hot oil in the tank 72. The proportioning valve 224 is actuated once each day to dispense into the hot oil bath in the tank 72 a predetermined amount of citric acid which acts as a detergent or cleaner for the hot oil and for purifying the oil.

The sensor 194 is adapted to maintain the temperature of the oil between 350° and 450°. Preferably, it will be maintained between 400° and 425° F. During periods of low use, such as overnight, a control circuit is provided coupled to the heating circuit for maintaining the hot oil at a lower temperature, such as between 180° and 220°, and preferably about 200° F. This control circuit can be coupled to the electrical circuitry 158 shown in FIG. 16 for causing a time delay in the delivery of frozen foodstuff to the conveyor 78 to allow the hot oil bath in the deep frying tank 72 to be heated to a cooking temperature of between 400° and 425° F.

Figure 14:
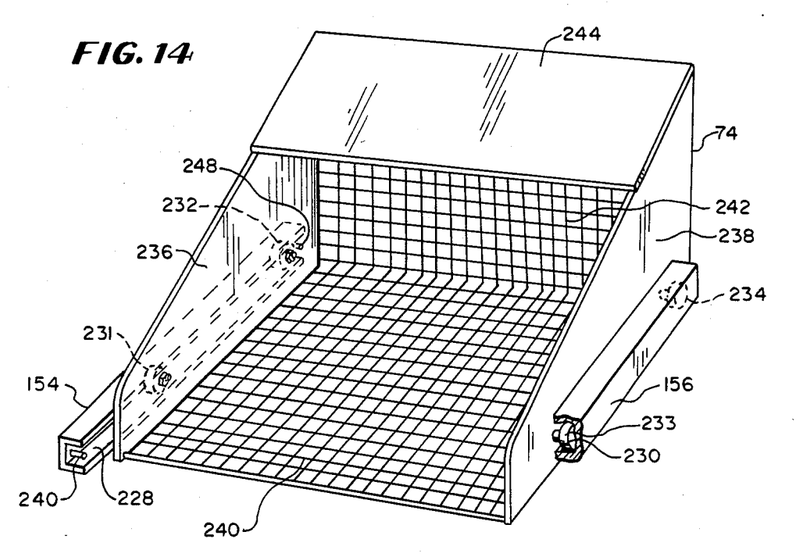
FIG. 14 is a perspective view of the frying basket.

As best shown in FIG. 14, the two guide bars 154 and 156 of the framework 152 for mounting the frying basket 74 are preferably U-shaped in cross-section to provide an internal channel 228,230 in which are received spaced-apart rollers 231,232 in channel 228 in guide bar 154 and 233 and 234 in channel 230 in guide bar 156. These rollers 231-234 are mounted on short stub shafts which are fixed to side walls 236 and 238 of the basket 78. As shown, the basket 78 then has a mesh bottom wall 240 and mesh rear wall 242. If desired, a short top wall 244 can be provided fixed to the upper inclined edges of the side walls 236 and 238 of the basket 74. Stops such as stops 246 and 248 are provided at the end of each channel 228, 230 for limiting rolling movement of the basket 74.

With this construction of the basket 74, when the framework 152, including the guide bars 154, 156 is rotated from the receiving or at-rest position shown in FIG. 10 to the frying position shown in FIG. 11, the basket 74 will roll on the rollers 231-234 in the channels 228, 230 into the frying tank 72 until they hit stops 246. Then, when the frying basket 74 is lifted from its oil drip position at or below the at-rest or receiving position to the dump position shown in FIG. 12, the frying basket 74 will roll on the rollers 231-234 in the channels 228 and 230 until the rollers 231-234 hit the stop 248 and will stay at that position when the basket 74 is then lowered to the receiving or at-rest position.

Figure 15:
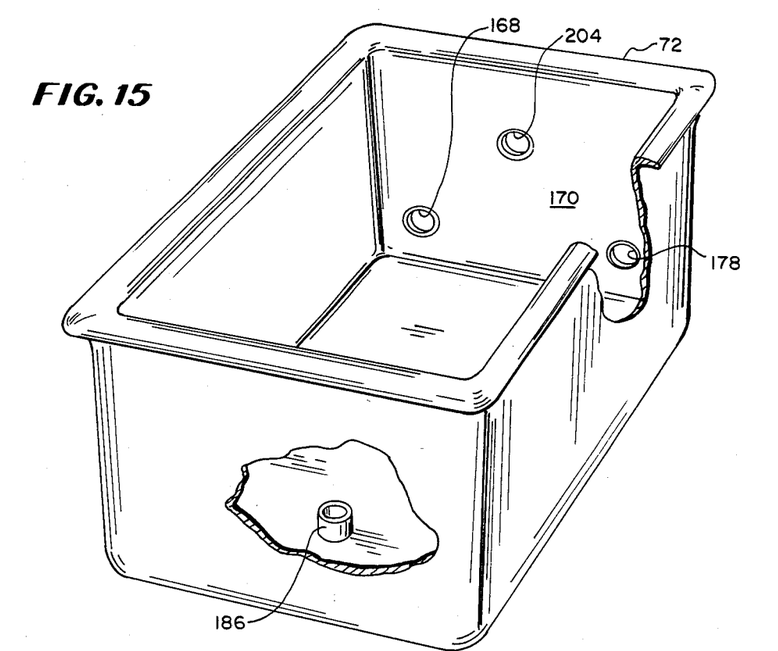
FIG. 15 is a perspective view of the deep frying tank with portions broken away.

The deep frying tank 72 is shown emptying in FIG. 15 to show the openings 168, 180, 204 and the side wall 170 are shown as well as the upper end of the conduit 181 extending to the bottom wall of the frying tank 72.

Referring now to FIG. 16, there is illustrated the electrical control circuitry 158 for operating the moving parts of the french fry vending machine 10.

As shown, after one of the switches 41-42 is actuated, and a coin has been inserted in the coin box, processing circuitry 250 is actuated to energize timer 1 for supplying voltage to the conveyor motor 124 and the vibrator motor 254 for causing vibration of the hopper and movement of the conveyor 78 for a timed period.

At the same time, a circuit 256 energizes the motors 111, 112, 113 and 114 connected to the selected depressed switch 41, 42, 43 or 44 for operating the associated metered foodstuff dispensing wheel for dispensing a metered quantity of selected frozen foodstuff from a compartment 81, 82, 83 or 84 of the hopper 80 onto the conveyor 78. This operation is controlled by timer 1 which has a switch arm 258 operated by one of the cams 261–264 of the cam arrangement 160. At the same time, timer 2 is energized by the processing circuitry 250 and after a predetermined time period turns on the motor 140 to rotate the disc 144 a predetermined angular rotation which is determined by the point where a cam 162 causes movement of a switch arm 264 of the timer 2 to cause deenergization of the motor 140. At this time, a timer 3 is energized and will, after a predetermined time period such as 60 seconds, a cooking cycle, energize the motor 140 to cause it to rotate until the cam 263 moves a switch arm 163 to deenergize the timer 3. At this point in time, the timer 4 is energized and times for a predetermined time period equal to a few seconds, or oil drip time, after which timer 4 energizes the motor 140 and causes it to move from the drip position through the dispensing position and back to the receiving or at-rest position.

In the meantime, after a predetermined amount of rotation of the motor shaft of the motor 140 the cam 261 will move the switch arm 161 to a position where the timer 1 is deenergized. After both timer 1 and timer 4 are deenergized, the electrical circuitry 168 has completed a full cycle.

It will be understood that the timers 1-4 and the processing circuitry 250 can be replaced by a microprocessor based system.

Also, it is to be understood that there are separate electrical circuits not shown for other electrical components of the machine 10. For example, there is an electrical circuit in the control box 166 as described above for controlling operation of the pumps in the oil recirculating circuit and for oil heating and for operating the exhaust fan for the filter assembly.

Further, there will be a separate electrical circuit for the refrigeration unit which will be automatically time controlled to defrost every eight hours. Additionally, a sensor 270 is located on the inside back wall of the housing 12 for sensing temperature in the refrigeration compartment 79. Also, as a safeguard another temperature sensor 272 is mounted on the intermediate wall 134 between the refrigeration chamber and the cooking chamber to sense any increase in temperature in the refrigeration chamber such as would occur if the solenoid operated trap door 136 became frozen in an open position.

Further, as stated above, a fire extinguisher 210 is mounted on the inside left wall of the housing 12 and is automatically operated by a sensor 212 which activates the fire extinguisher at predetermined temperature level.

From the foregoing description, it will be apparent that the french fry vending machine 10 of the present invention has a number of advantages some of which have been described above and others of which are inherent in the invention. Accordingly, the scope of the invention is only to be limited as necessitated in the accompanying claims.

We claim:

1. In a french fry vending machine comprising a housing having a front panel and a back panel, an insulated refrigeration chamber within the housing, a cooking chamber within the housing, a coin box including a coin operated switch for energizing the machine, means for transferring foodstuff from the refrigeration chamber to the cooking chamber, means for french frying the foodstuff in the cooking chamber, and means for dispensing the french fried foodstuff, the improvement comprising a plurality of frozen foodstuff holding compartments in said refrigeration chamber, a metered dispensing mechanism positioned below the outlet from each of said holding compartments, said metered dispensing mechanisms including an individual metered foodstuff dispensing rotatable wheel for each frozen foodstuff holding compartment, means for activating a selected one of said dispensing rotatable wheels to dispense a metered quantity of the selected frozen foodstuff onto said transfer means, and means for operating said transfer means to deliver said selected metered quantity of frozen foodstuff to said cooking chamber.

2. In a french fry vending machine comprising a housing having a front panel and a back panel, an insulated refrigeration chamber within the housing, a cooking chamber within the housing, a coin box including a coin operated switch for energizing the machine, means for transferring foodstuff from the refrigeration chamber to the cooking chamber, means for french frying the foodstuff in the cooking chamber, and means for dispensing the french fried foodstuff, the improvement comprising a plurality of frozen foodstuff holding compartments in said refrigeration chamber, a metered dispensing mechanism positioned below the outlet from each of said holding compartments, said metered dispensing mechanisms including an individual metered foodstuff dispensing rotatable wheel for each frozen foodstuff holding compartment, means for activating a selected one of said dispensing rotatable wheels to dispense a metered quantity of the selected frozen foodstuff onto said transfer means, and means for operating said transfer means to deliver said selected metered quantity of frozen foodstuff to said cooking chamber, said metering mechanism including individually operated metered foodstuff dispensing rotatable wheels, said dispensing rotatable wheels being located in a line, and said means for transferring frozen foodstuff from said refrigeration chamber to said cooking chamber comprising a conveyor position beneath said line of metered dispensing rotatable wheels.

3. In a french fry vending machine comprising a housing having a front panel and a back panel, an insulated refrigeration chamber within the housing, a cooking chamber within the housing, a coin box including a coin operated switch for energizing the machine, means for transferring foodstuff from the refrigeration chamber to the cooking chamber, means for french frying the foodstuff in the cooking chamber, and means for dispensing the french fried foodstuff, the improvement comprising a oil circulating, filtering, heating and replenishment system including a deep frying tank for holding a quantity of hot oil into which a selected metered amount of frozen foodstuff is immersed for a predetermined period of time for cooking, i.e. french frying, of the selected metered amount of foodstuff, means for recirculating oil from said tank through a pump and filter system, a heating chamber coupled to the output of said filter system and to a hot oil inlet to said tank for heating the oil outside of said tank, and means for sensing when the level of hot oil in said tank falls below a preselected level, and means responsive to said sensing for replenishing the oil in said tank.

4. The machine of claim 1, wherein each of said holding compartments has a hole at its lower end positioned above one of said metered dispensing rotatable wheel.

5. The machine of claim 1, wherein said plurality of frozen foodstuff holding compartments in said refrigeration chamber includes an electromechanical vibrator mounted on the back inclined side wall of the holding compartment to vibrate frozen foodstuff to the bottom opening of each frozen foodstuff holding compartment and into a metered dispensing rotatable wheel.

6. The machine of claim 1, wherein the metered foodstuff dispensing rotatable wheel has a wide slot along a cord of the circle of the wheel to provide a metered space into which only a predetermined amount of foodstuff can fit.

7. The machine of claim 1, wherein said means for transferring frozen foodstuff from said refrigeration chamber to said cooking chamber includes a solenoid operated trap door hingedly mounted to a wall between said refrigeration chamber and said cooking chamber.

8. The apparatus of claim 1, wherein said deep frying tank includes a larger coarse mesh screen and a fine mesh screen positioned below the coarse mesh screen for collecting fine particles.

9. The apparatus of claim 3, wherein said means for recirculating oil from said tank through a pump and filter system includes a drain conduit extending below said heating chamber and a drain valve in said drain conduit which is activated after a certain predetermined number of frying operations to drain used cooking oil to a used oil container positioned below said heating chamber.

10. The apparatus of claim 3, wherein said means for recirculating oil from said tank through a pump and filter system includes a container of a purifying chemical having a conduit extending therefrom to a proportioning valve to an outlet positioned above the level of oil in said deep frying tank to dispense a purifying chemical to said deep frying tank.

11. The apparatus of claim 3, wherein said means for sensing when the level of hot oil in said tank falls below a preselected level comprises a float switch mounted within a level control tube.

12. The apparatus of claim 3, wherein said heating chamber includes electromagnetic heating coils therearound.

13. The apparatus of claim 3, wherein said filter system includes a multi-layered air filtering assembly having as the first lower level a grease and fire trap, a second level comprising an electronic fine particle filter, an upper layer charcoal filter above the fine particle filter, and a top layer of wetted curls of polypropylene.

14. In a french fry vending machine comprising a housing having a front panel and a back panel, an insulated refrigeration chamber within the housing, a cooking chamber within the housing, a coin box including a coin operated switch for energizing the machine, means for transferring foodstuff from the refrigeration chamber to the cooking chamber, means for french frying the foodstuff in the cooking chamber, and means for dispensing the french fried foodstuff, the improvement residing in said means for french frying foodstuff and said means for dispensing french fried foodstuff comprising a basket and means for positioning and moving said frying basket from a foodstuff receiving position, a frying position in a hot oil bath, a drain position and a dispensing position in a timed sequence.

15. The machine of claim 14 wherein said positioning and moving means includes a plurality of eccentric cams on said output shaft and an equal number of switches each having a movable switch arm engageable with one of said cams.

16. The machine of claim 14 wherein said positioning and moving means includes a motor with an output shaft, a linkage between said output shaft and said basket and a timer for controlling the time periods said output shaft is at the different positions which establish the different positions of said basket.

17. The machine of claim 16 wherein said basket is supported on a generally rectangular frame having a front end fixed to a frame shaft journaled for limited rotation and said linkage includes a disk on said shaft, a first arm coupled to said disk and a second arm coupled between said first arm and said frame shaft.

18. The machine of claim 16 wherein said basket is slidable on said frame between a generally horizontal foodstuff receiving position on said frame and a frying position at a rear end of said frame when the frame is rotated to an inclined position where said basket slides downwardly into said oil bath to said frying position.

19. The machine of claim 18 wherein said frame includes two, U in cross-section, side rails and said frying basket includes four wheels or rollers, two on each side, received in said respective side rails.

20. The machine of claim 14 wherein said cooking chamber includes fire extinguishing means.

* * * * *